United States Patent
Coates

(10) Patent No.: US 6,666,458 B2
(45) Date of Patent: Dec. 23, 2003

(54) VALVE SEAL FOR ROTARY VALVE ENGINE

(76) Inventor: George J. Coates, Rte. 34 & Ridgewood Rd., Wall, NJ (US) 07719

(*) Notice: Subject to any disclaimer, the term of this patent is extended or adjusted under 35 U.S.C. 154(b) by 18 days.

(21) Appl. No.: 10/074,311

(22) Filed: Feb. 12, 2002

(65) Prior Publication Data

US 2003/0160393 A1 Aug. 28, 2003

(51) Int. Cl.[7] .................................................. F01L 7/10
(52) U.S. Cl. .................... 277/500; 277/586; 123/190.1; 123/190.14; 251/311
(58) Field of Search ......................... 123/190.1, 190.14, 123/19 R, 19 E; 277/500, 502, 586; 251/311, 192

(56) References Cited

U.S. PATENT DOCUMENTS

| | | | |
|---|---|---|---|
| 4,768,559 A | * 9/1988 | Hehl | 137/887 |
| 4,944,261 A | * 7/1990 | Coates | 123/190.14 |
| 4,953,527 A | * 9/1990 | Coates | 123/190.4 |
| 4,989,576 A | * 2/1991 | Coates | 123/80 D |
| 5,109,814 A | * 5/1992 | Coates | 123/190.14 |
| 5,361,739 A | * 11/1994 | Coates | 123/190.14 |

* cited by examiner

Primary Examiner—Anthony Knight
Assistant Examiner—E. Peavey
(74) Attorney, Agent, or Firm—Clifford G. Frayne

(57) ABSTRACT

A ceramic composite valve seal for a rotary valve assembly for use in internal combustion engines having rotary intake valves and rotary exhaust valves which have a spherical peripheral surface, the valve seal being of two-piece construction surrounding the intake or exhaust port and having an upper surface designed to contact the peripheral surface of the rotary valve, the two-piece construction defining a channel whereby compressed gases exert additional pressure on the seal enhancing the sealing contact between the seal and the valve.

5 Claims, 4 Drawing Sheets

VALVE SEAL FOR ROTARY VALVE ENGINE

BACKGROUND OF THE INVENTION

1. Field of the Invention

The present invention relates to an internal combustion engine of the piston-cylinder type having a spherical rotary valve assembly for the introduction of the fuel/air mixture to the cylinder and the evacuation of the exhaust gases and is particularly directed towards the valve seals for such rotary valve assembly.

2. Description of the Prior Art

Applicant has U.S. Pat. Nos. 4,989,558; 4,989,576; 4,944,261; 4,976,232; 5,361,739; 4,953,527; and 5,109,814 directed to the design of a spherical rotary valve assembly for an internal combustion engine of the piston and cylinder type which are incorporated herein by reference. The patents are directed towards the spherical rotary valve assembly having the rotary intake valve and rotary exhaust valve mounted on single or dual shafts having single or dual ports to operate at one-half or one-quarter speed of the engine's revolutions per minute. The '232 patent teaches a sealing means in which seals are positioned in the spherical rotary valve assembly in contact with the rotary intake valve and rotary exhaust valve. These prior seals consisted of a contact ring which was fabricated of metal having an annular groove in the upper surface in which a ceramic composite was embedded, the surface of the ceramic composition contacting the spherical surface of the valve. The advantages of Applicant's invention and the background thereof are set forth in the prior patents.

This present application is directed towards an improved seal for use with the rotary intake valve and rotary exhaust valve which provides for an improved gas tight seal during the introduction of the fuel/air mixture and the evacuation of the spent gases. The design of this improved seal is such that it provides for an improved seal by utilizing the compression and expansion of the fuel/air mixture in the cylinder to effectuate a gas tight seal with the rotary intake valve and rotary exhaust valve during the compression stroke.

The improved seal is formulated of a ceramic composite cooperable with the valve to achieve sealing engagement during the power and exhaust stroke of the engine and prevent metal to metal contact with the spherical surface of the valve.

OBJECTS OF THE INVENTION

An object of the present invention is to provide for an improved, novel and unique seal for rotary valve mechanism for internal combustion engines fabricated entirely from ceramic composite.

Another object of the present invention is to provide for an improved, novel and unique seal for the spherical rotary valve assembly of an internal combustion engine which increases the efficiency of the engine.

A still further object of the present invention is to provide for an improved, novel and unique seal for a spherical rotary valve assembly which decreases the friction in the internal combustion engine.

A still further object of the present invention is to provide for an improved, novel and unique seal for a spherical rotary valve assembly which requires no external lubrication and is more easily fabricated.

SUMMARY OF THE INVENTION

A valve seal for a rotary valve assembly for use in internal combustion engines having rotary intake valves and rotary exhaust valves, the seal having a receiving ring disposed about the intake or exhaust port of the cylinder, the receiving ring having a contact ring removably secured therein, the contact ring being biasly mounted by means of a beveled spring between the receiving ring and the contact ring, the contact ring having a plurality of blast rings secured thereabout, the receiving ring and contact ring defining a channel for compressed gases to act upon the blast rings, the contact ring having a curved upper surface for contact with the peripheral surface of the intake valve or the exhaust valve for maintaining a seal during the operation of the engine, the contact ring being fabricated of a ceramic composite.

BRIEF DESCRIPTION OF THE DRAWINGS

These and other objects of the present invention will become evident, particularly when taken in light of the following illustrations wherein.

DETAILED DESCRIPTION OF THE DRAWINGS

Figure 1:
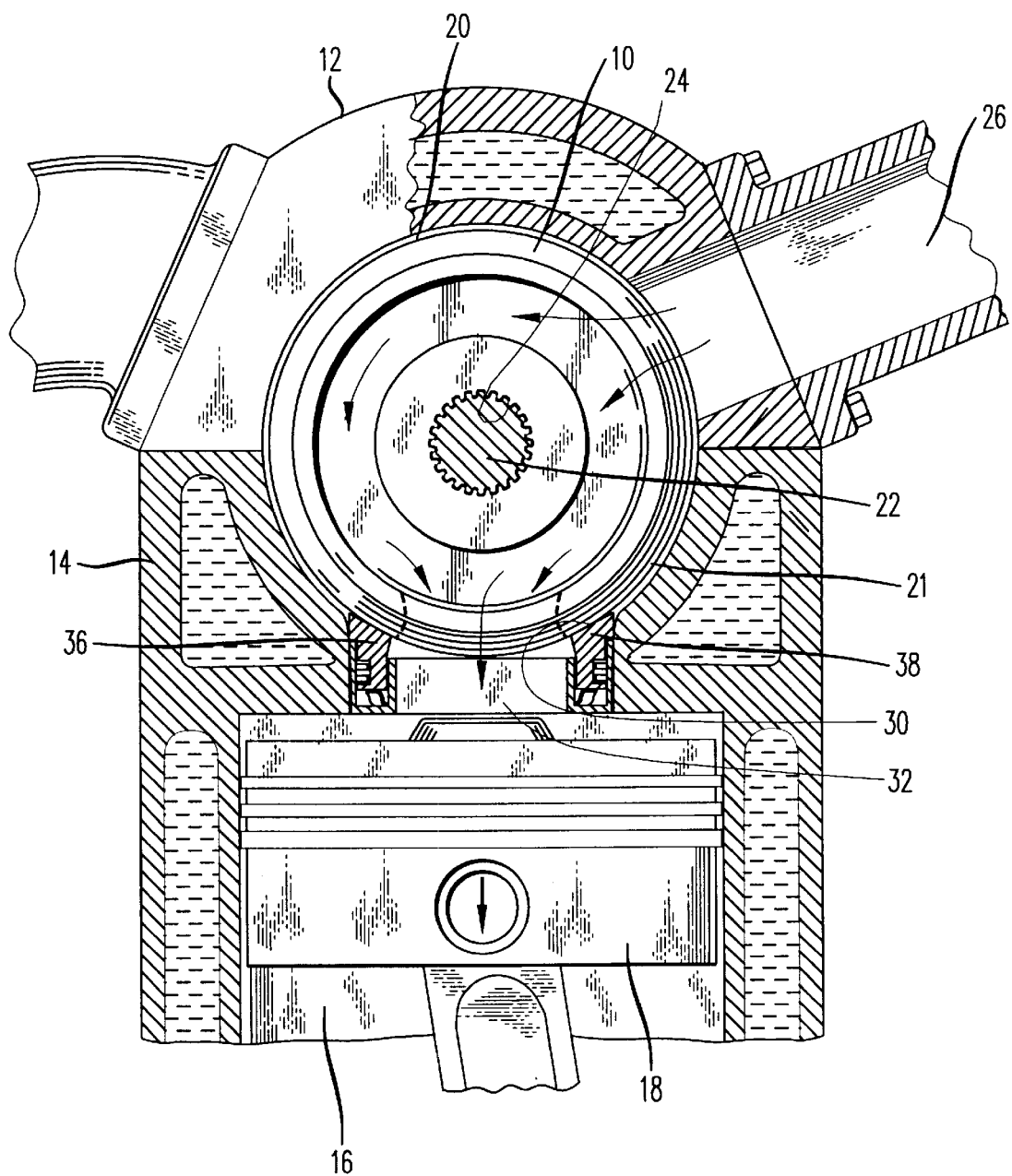
FIG. 1 is an end cross sectional view of the head of the spherical rotary valve assembly showing the relationship of a spherical rotary intake valve to the cylinder and piston and the valve seal.

Referring to FIG. 1, there is shown an end cross sectional view of the spherical rotary valve assembly detailing the relationship between a rotary intake valve 10, enclosed within an upper half 12 and a lower half 14 of the split head assembly. The split head assembly is secured to an engine block having cylinder 16 within which piston 18 reciprocates.

The split head assembly comprising upper half 12 and lower half 14 defines a drum accommodating cavity 20 within which rotary intake valve 10 is positioned. Rotary intake valve 10 is positioned on shaft 22 which passes through centrally-positioned aperture 24 on rotary intake valve 10. As discussed in the prior identified applications, rotary intake valve 10 provides for communication between fuel/air inlet port 26 and cylinder 16 by means of an aperture 30 positioned on the periphery 21 of rotary valve 10 which comes into successive registration with inlet port 32 to cylinder 16.

Rotary intake valve 10 rotating within drum accommodating cavity 20 on shaft 22 is in contact with valve seal 36 annularly positioned in annular groove 38 about inlet port 32 to cylinder 16. Rotary intake valve 10 does not contact the walls of drum accommodating cavity 20. Valve seal 36 serves to provide a seal to ensure that the fuel/air mixture passes from rotary intake valve 10 into cylinder 16 during the intake stroke and further, provides a seal with rotary intake valve 10 during the compression stroke to ensure that the ignition of the fuel/air mixture occurs within cylinder 16 and does not migrate into drum accommodating cavity 20. Further, seal 36 provides a seal with rotary intake valve 10 during the exhaust stroke to ensure that the exhaust gases exit through the rotary exhaust valve.

The description of valve seal 36 is contained herein is made with respect to the rotary intake valve as shown in FIG. 1. Valve seal 36 is of the same design and serves the same purpose and function with respect to its relationship with the rotary exhaust valve of the spherical rotary valve assembly as disclosed in the pending applications identified herein and shown in FIG. 6.

Figure 5:
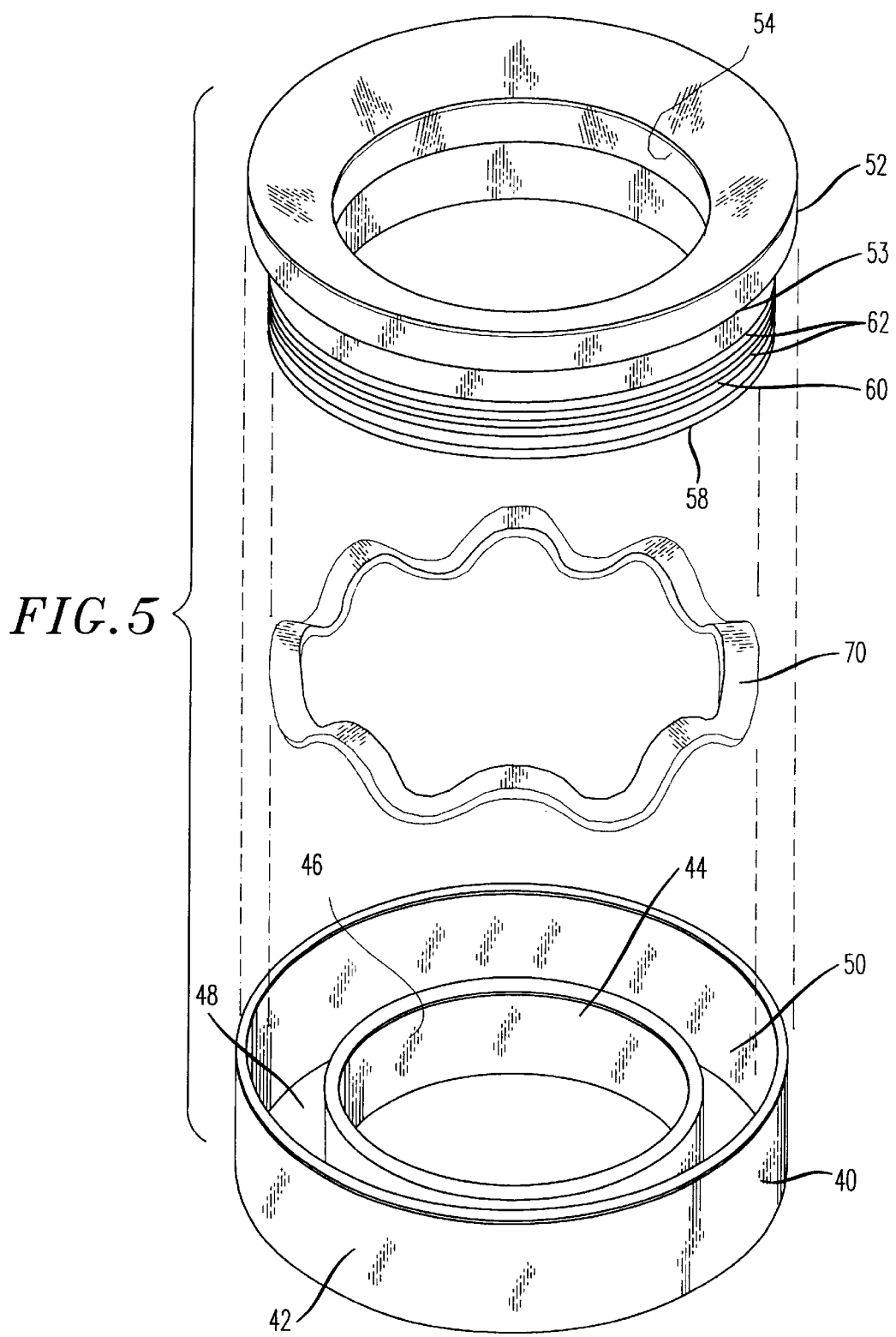
FIG. 5 is an exploded view of the valve seal.

Valve seal 36 is comprised of two primary members as shown in an exploded view in FIG. 5. A lower receiving ring 40 is configured to be received within annular groove 38 in lower half 14 of the split head, circumferentially positioned about inlet port 32. Lower receiving ring 40 has an outer circumferential wall 42 and an inner circumferential wall 44 defining aperture 46 which is coincidental with inlet port 32. Inner circumferential wall 44 and outer circumferential wall 42 are secured by planer circumferential base 48 thereby defining an annular receiving groove 50. Annular receiving groove 50 is for the receipt of upper valve seal ring 52.

Upper valve seal ring 52 has a centrally-disposed aperture 54 in alignment with aperture 46 in lower receiving member 40. The outer wall 53 of upper valve seal member 52 is stepped inwardly from upper surface 56 to lower surface 58 in order to define an annular groove 60 for receipt of a blast ring 62 as defined hereafter. Upper valve seal member 52 is designed to fit within annular groove 50 in lower valve seal receiving member 40. Upper valve seal 52 is fabricated from a ceramic composite.

Figure 2:
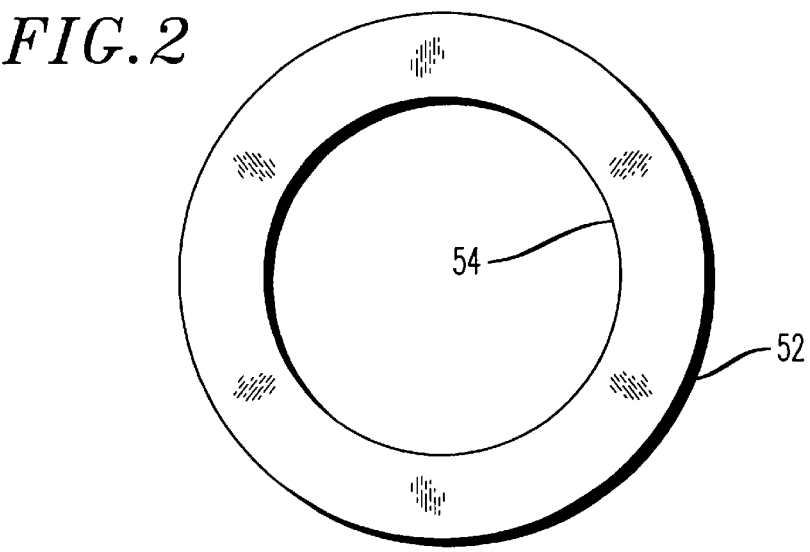
FIG. 2 is a top view of the valve seal.
Figure 3:
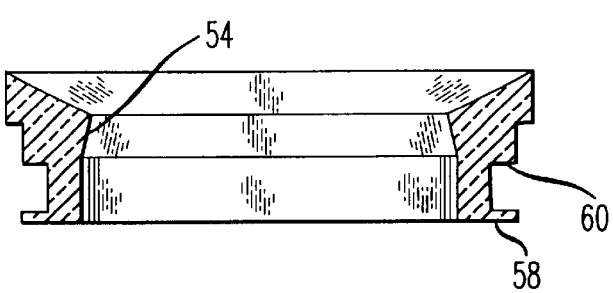
FIG. 3 is a side cutaway view of the valve seal.

Referring to FIGS. 2 and 3, there is shown a top planer view and side cutaway view of upper valve seal ring 52 respectively, which is fabricated of ceramic composite.

Ceramic composite ring 52 contacts the peripheral surface of rotary intake valve 10. The curvature of upper surface 56 is such that it conforms to the peripheral curvature of intake rotary valve 10 being in intimate contact with the peripheral surface 21 of rotary intake valve 10.

The contact between ceramic composite ring 52 and the peripheral surface of rotary intake valve 10 is maintained by annular beveled springs 70, positioned in annular receiving groove 50 below upper valve seal ring 52. The pressure to be maintained upwardly on upper valve seal ring 52 is in the range of between 1 to 4 ounces. As such, this pressure can be accomplished by either a single bevel spring located in annular receiving groove 50 or a plurality of annular beveled springs.

Figure 4:
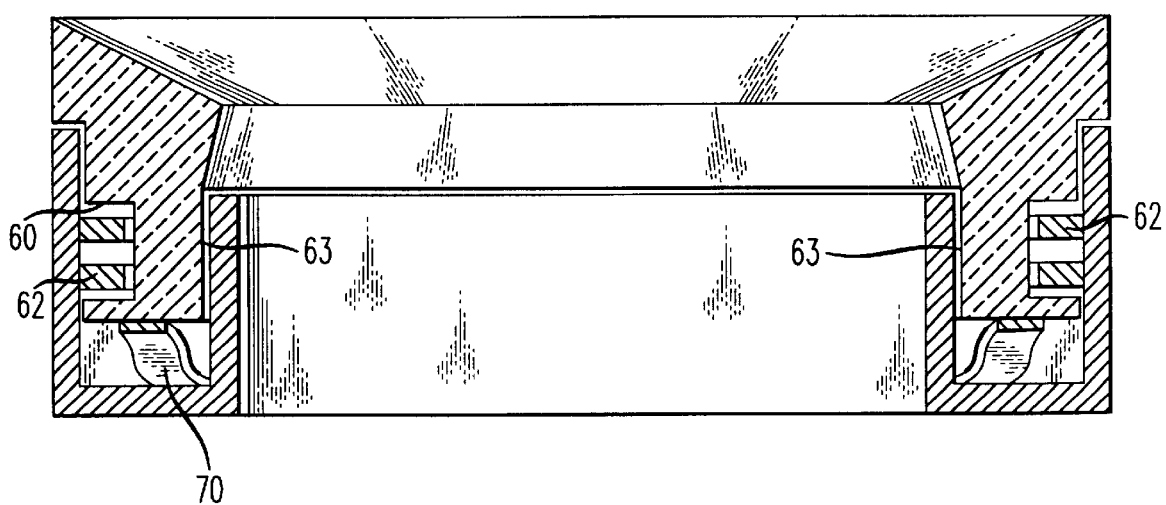
FIG. 4 is a side cutaway view of the valve seal mounted in the split head.

As best can be seen from FIG. 5, the exploded view of the valve seal and FIG. 4, a side cross sectional view of the valve seal, upper valve seal ring 52 has positioned about annular groove 60, a blast ring 62 which functions similar to the piston ring associated with a piston.

Figure 6:
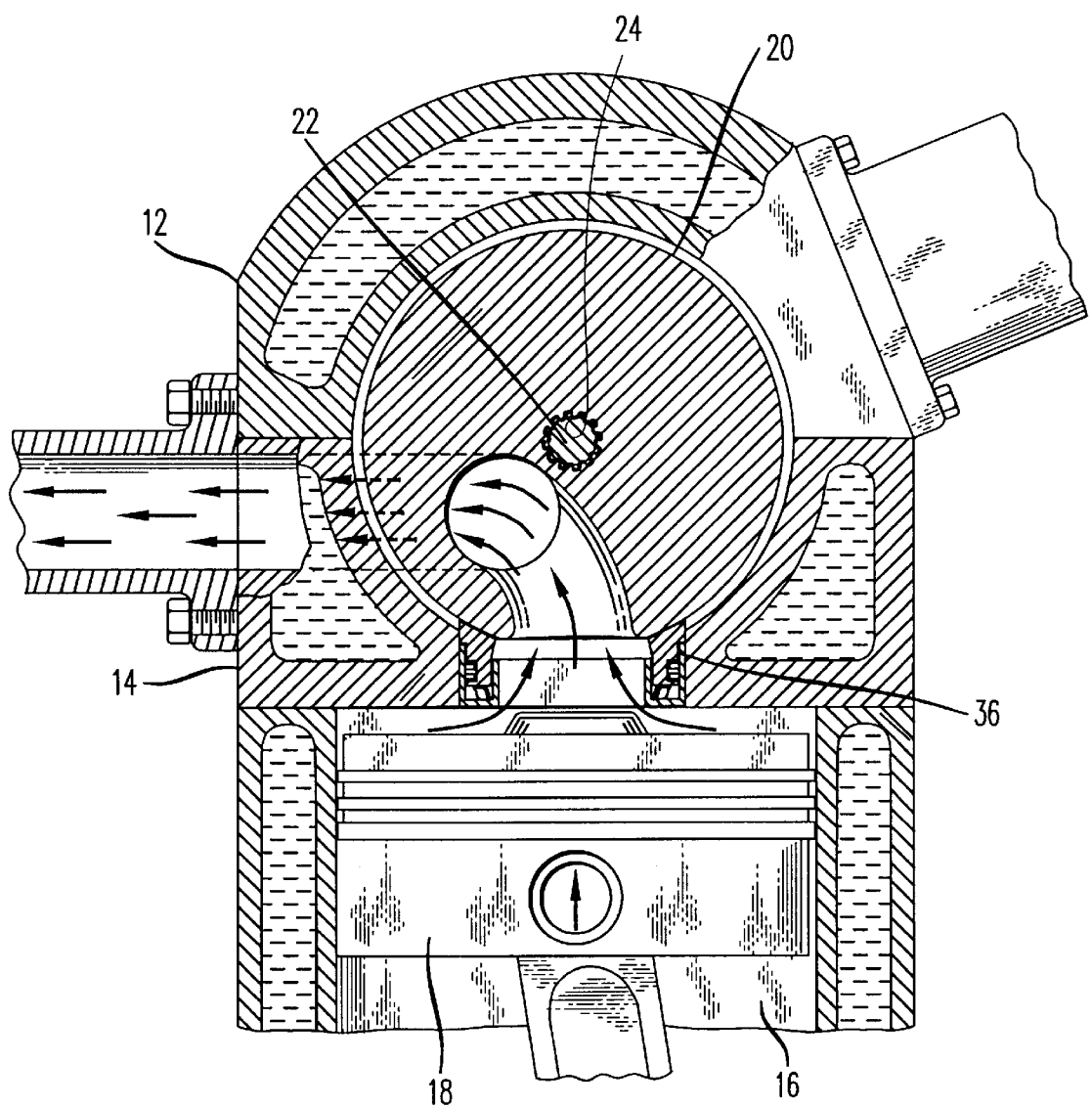
FIG. 6 is an end cross sectional view of the head of the spherical rotary valve assembly showing the relationship of a spherical rotary exhaust valve to the cylinder and piston and the valve seal.

Blast ring 62 serves to provide additional sealing contact between valve seal 36 and the peripheral surface of rotary intake valve 10 and the rotary exhaust valve during the compression and power stroke. The increased gas pressure within the cylinder and within annular groove 50 will increase the pressure below the blast ring 62 which forms a seal with outer circumferential wall 42 preventing the escape of gasses and yet providing an upward force on upper valve seal ring 52 thus forcing a better contact seal between carbon insert ring 64 and the peripheral surface 21 of the rotary intake valve 10. The same interaction will occur with the valve seal 36 associated with the rotary exhaust valve (FIG. 6). During the intake and exhaust stroke, the carbon insert ring 64 will be maintained in contact with the rotary exhaust valve by means of the beveled springs positioned in annular groove 50.

The upward pressure during the combustion or power stroke is transmitted to upper valve seal ring 52 by means of the compression of the gases in the cylinder and in inlet port 32 by means of passageway 63 between upper valve seal ring 52 and lower receiving ring 40 such that the gases can expand into annular receiving groove 50 beneath upper valve seal 52 but are prevented from escaping by means of blast rings 60 in contact with outer circumferential wall 42 of lower receiving ring 40. This provides additional pressure along with bevel spring 70 in providing contact between upper ring 52 66 and the peripheral surface of the valve. This same function occurs with respect to valve seal 36 in conjunction with the intake valve as shown in FIG. 1 as well as with the exhaust valve as shown in FIG. 6.

The configuration of valve seal 36 provides for an intimate seal with the intake rotary valve or exhaust rotary valve and, in fact, is the only contact with the intake rotary valve or exhaust rotary valve communicates with in the course of its revolution within the drum accommodating cavity. This significantly reduces the number of mechanical parts within the engine and thereby reduces the friction encountered in the operation of the engine.

Additionally, inherent in the design of valve seal 36 is the ability for the upper valve seal ring 52 to rotate within lower receiving ring 40 which will provide for uniform wear with respect to the valve seal.

While the present invention has been described in connection with the exemplary embodiment thereof, it will be understood that many modifications will be apparent to those of ordinary skill in the art and the application is intended to cover any adaptations or variations thereof. Therefore, it is manifestly intended that this invention be limited only by the claims and the equivalents thereof.

I claim:

1. A valve seal for a rotary valve assembly for use in internal combustion engines of the piston and cylinder type, said rotary valve assembly positioned within a two-piece cylinder head, said cylinder head defining a plurality of drum accommodating cavities for receipt of a plurality of rotary intake valves and rotary exhaust valves, said rotary intake valves and said rotary exhaust valves having a spherical section defined by two parallel planes of a sphere, said planes being disposed symmetrically about the center of said sphere, defining a spherical periphery and planer end walls, said rotary intake valves and said rotary exhaust valves mounted on a shaft means within said drum accommodating cavities in gas-tight sealing contact with an inlet port and an exhaust port respectively, said rotary intake valves and said rotary exhaust valves having passageways therethrough for the introduction and interruption of fuel/air mixture to the engine and the evacuation of exhaust gases from the engine respectively, said gas-tight sealing contact of said rotary intake valve and said rotary exhaust valve with said intake port and said exhaust port, respectively, accomplished by a valve seal comprising:

a receiving ring, substantially circular in cross sectional area having defined therein, an annular receiving groove, said receiving ring engageably secured in said cylinder head about said inlet port or said exhaust port, said receiving ring having an aperture therethrough coincidental with said inlet port or said exhaust port;

a ceramic composite contact ring removably securable within said annular receiving groove of said receiving ring, said contact ring having a curved upper surface conforming to said spherical periphery of said intake valve or said exhaust valve, said contact ring having an aperture therethrough coincidental with said aperture of said receiving ring and said inlet port or said outlet port;

a spring bias means positioned in said annular receiving groove of said receiving ring, positioned below said contact ring and exerting upward pressure on said contact ring;

a sealing means positioned about said contact ring in contact with said outer wall of said annular receiving groove;

a communicating passageway between said inlet port or said outlet port and said sealing means secured to said contact ring.

2. A valve seal for a rotary valve engine in accordance with claim 1 wherein said sealing means on said contact ring comprises one or more blast rings removably positioned about said contact ring, said blast rings providing intimate contact with said outer wall of said annular receiving groove of said receiving ring.

3. A valve seal for a rotary valve mechanism in accordance with claim 1 wherein said spring means positioned in said annular receiving groove below said contact ring comprises one or more beveled springs providing upward pressure on said contact ring engaging said curved surface of said contact ring with said peripheral surface of said rotary intake valve or said rotary exhaust valve.

4. A valve seal for a rotary valve mechanism in accordance with claim 1 wherein said spring means exerts pressure in the range of one to four ounces upwardly on said contact ring.

5. A valve seal for a rotary valve mechanism in accordance with claim 1 wherein said contact ring removably secured within said receiving ring is rotatable within said receiving ring.

* * * * *